Jan. 29, 1963    N. G. ANDERSON    3,075,694
PARTICLE SEPARATION METHOD
Filed Dec. 29, 1958    2 Sheets-Sheet 1

INVENTOR.
Norman G. Anderson
BY
ATTORNEY

Jan. 29, 1963   N. G. ANDERSON   3,075,694
PARTICLE SEPARATION METHOD
Filed Dec. 29, 1958   2 Sheets-Sheet 2

INVENTOR.
Norman G. Anderson
BY
ATTORNEY

United States Patent Office 3,075,694
Patented Jan. 29, 1963

3,075,694
PARTICLE SEPARATION METHOD
Norman G. Anderson, Oak Ridge, Tenn., assignor to the United States of America as represented by the United States Atomic Energy Commission
Filed Dec. 29, 1958, Ser. No. 783,628
3 Claims. (Cl. 233—40)

This invention relates to the separation of particles of different sizes or densities, and more particularly to a method of increasing the rate of sedimentation of dissolved or suspended substances which are under the influence of a centrifugal field without increasing the centrifugal force, and for more effectively separating substances with differing rates of sedimentation.

In the field of separation and fractionation of proteins and other colloids, four general methods are available for analytical or preparative application. These are electrophoresis, precipitation, chromatography and adsorption, chromatography and adsorption, and ultracentrifugation. A method complementary to ultracentrifugation is that of zone ultracentrifugation in continuous density gradients.

In the prior art of ultracentrifugation it has been the practice to provide a free solution in which the substance to be sedimented is dissolved. The resulting solution or suspension is placed in a centrifuge and sedimentation is brought about by the application of centrifugal force by the operation of the centrifuge, generally over long periods. With available ultracentrifuge rotors sedimentation of proteins requires many hours to several days. Particles of smaller dimensions than colloids have also been sedimented but special high speed equipment is required, and a proportionately longer time.

Applicant with a knowledge of this problem of the prior art has for an object of his invention the provision of an improved method for fractionating colloidal mixtures and separating their components.

Applicant has as another object of his invention the provision of a method for increasing the rate of sedimentation of dissolved or suspended substances during ultracentrifugation while stabilizing the boundaries and making recovery of the fractions less difficult.

Applicant has as another object of his invention the provision of a method for more rapid separation of dissolved or suspended components by sedimentation resulting from centrifuging a liquid having an agent that will result in selective transport of the more rapidly sedimenting particles to the bottom while the lighter particles are diffused out of the descending streams.

Applicant has as a further object of his invention the provision of a method for separating components of a solution or suspension by centrifuging and sedimentation wherein the descending streams result in the transport of lighter particles which are displaced upward by the down streaming heavy fluid.

Applicant has as a still further object of his invention the provision of a method for the selective removal of undesirable protein materials in hypodermically administered immunizing and therapeutic agents such as the serums and vaccines produced in animal media, by employing his improved separating agent during the application of centrifuging and sedimentation to the fluid.

Applicant has as a still further object of his invention the provision of a method for separation of the components of a solution or suspension which is not limited in its application to the sedimentation of large molecules, but is applicable in principle to solutions of small molecules and ions, and to the separation of various isotopes.

Other objects and advantages of my invention will appear from the following specification and accompanying drawings, and the novel features thereof will be particularly pointed out in the annexed claims.

In the drawings, FIG. 1 is a schematic of particles of a liquid, exaggerated in size to indicate the influence of a centrifugal field in the presence of my improved separating agent.

Applicant has discovered that when particles, or molecules, suspended in a liquid, are sedimented in a centrifugal field the distribution in the centrifuge tube is altered so that the particle concentration increases in the direction of the centrifugal force. The presence of a small stationary object offering a surface substantially perpendicular to the centrifugal field will cause a local pile-up of sedimenting particles. The liquid containing the higher concentration of particles at this surface will, by virtue of the higher density, flow off the surface and move as a discrete mass further in the direction of the increasing centrifugal force until the stream is randomized by thermal agitation. The net result is accelerated sedimentation.

Figure 1:
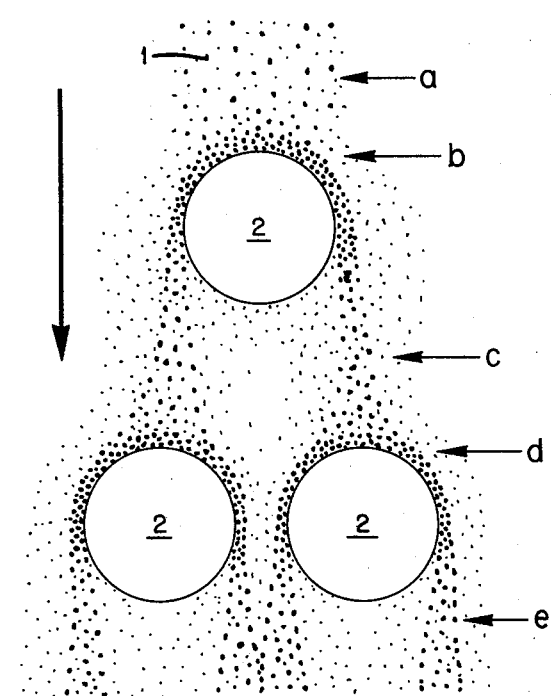

The effect is illustrated in FIG. 1 where larger particles, such as protein molecules, are separated from the smaller molecules or particles of a liquid, such as .1 molar NaCl solution or other dilute salt solution, or distilled water, in which they have been dissolved, by sedimentation through the application of centrifugal force, in a direction as indicated by the arrow. Small stationary objects, such as starch granules, also occupy the space and are preferably packed therein so that the liquid occupies the interstices.

At level $a$ is illustrated particles 1 of differing masses which are sedimenting in an unobstructed centrifugal field according to their respective sedimentation rates. At level $b$ the sedimenting particles collide with the surface of a stationary object, such as the starch particles 2, at which level a local concentration and density increase occurs. The denser fluid does not adhere to the stationary object but tends to flow off somewhat like a stream, over the surface and to move in the direction of increasing centrifugal field. As the denser fluid streams through region $c$ randomization occurs as a result of thermal agitation and the smaller more rapidly diffusing molecules drift out of the stream in accordance with the Brownian effect. If the liquid is filled with many insoluble stationary objects, the processes occurring at levels $b$ and $c$ will be repeated many times, as represented at levels $d$ and $e$.

The rate of transportation of the particles through the centrifugal field would appear to be governed by ($a$) the sedimentation rate of the particles, ($b$) their concentration, ($c$) the size and shape of the solid stationary objects, ($d$) the centrifugal force, ($e$) the temperature, ($f$) the viscosity of the liquid, and ($g$) the rate at which streaming material becomes randomized (the diffusion coefficient).

The sedimenting action is enhanced by the packing of powder in the sample tube. This is done by feeding a slurry containing a starch to the sample tube, then centrifuging to pack the powder, then removing the overlying liquid, and adding more slurry, and repeating the cycle.

The advantages of a centrifugation system which utilizes a packing of stationary objects in the centrifugal field, over a system having an unobstructed liquid field are (1) more rapid sedimentation of all components, (2) selective transport of the more rapidly sedimenting particles to the bottom, (3) additional selectivity based on the diffusion of the lighter particles out of the descending streams, and (4) further separation due to the transport of lighter particles in the fluid which are displaced upward by the downstreaming heavy fluid.

It is to be noted that the method functions only when the sedimenting material is of such a size that thermal agitation prevents the particles from being compacted against the surface which is substantially perpendicular to the direction of the centrifugal field. While this surface is shown as spherical, in practice it may be any configuration that does not have occluded surfaces. It is therefore best suited to the sedimentation and separation of particles of molecular size, including large organic molecules and proteins of molecular weight of one thousand to a million, for example, nucleic acids, and polysaccharides, and possibly viruses.

The present development has been found especially useful in studies of biological materials such as blood serum and hemoglobin. Potato starch granules are relatively inexpensive and have proven to be satisfactory stationary bodies. Particles of Lucite or other plastics are also satisfactory, and although glass beads may be used, protein particles tend to stick to their surfaces until the beads become covered. In short, most any powder with acceptable surfaces may be employed.

Figure 2:
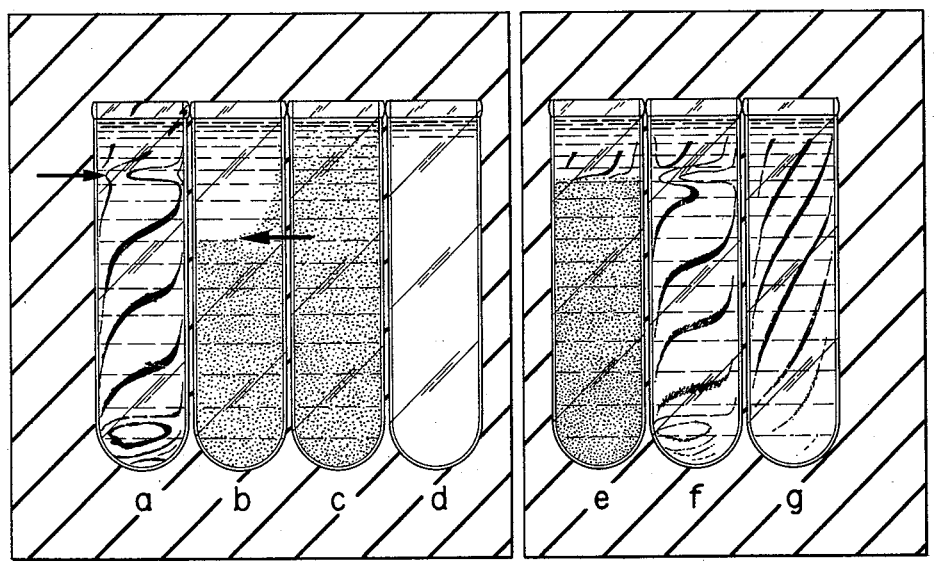
FIG. 2 is an elevation of samples of various liquids positioned adjacent an indicator chart to indicate the performance of my improved separating agent.

The process is generally carried out by placing the samples of the desired liquid in sample tubes such as shown in FIG. 2. These sample tubes are then placed in a conventional centrifuge, such as the "Spinco," Model L, preparative ultracentrifuge made by Beckman Instrument Company, and employing an SW 391 swinging-bucket rotor. Rates of sedimentation for certain materials in free solution have been compared with the rates for the same materials, in starch slurries. Determinations were also made using an analytical centrifuge, Spinco Model E, under precisely controlled conditions of rotor speed and temperature.

*Example I*

In one experiment, two analytical cells were used in the same rotor at the same time in the Spinco Model E analytical ultracentrifuge. One contained 1.5 percent stained bovine serum albumin in 0.1 ionic strength sodium chloride-phosphate buffer. The second cell contained the same solution plus suspended potato starch. During centrifugation the starch packed tightly leaving a fluid layer over the starch.

A Schlieren method for determining fluid boundaries by refractive index variation was used to determine the protein boundaries in both tubes during centrifugation, and in the control tube until the end of centrifugation. The distance the protein boundary sedimented in starch was determined by densitometric measurements on photographs made at the end of the run.

After acceleration to 56,100 revolutions per minute (r.p.m.) two boundaries were observed above the starch boundary, which moved at the same rate. The boundary peaks reached the upper level of the starch after 48 minutes of centrifugation at this operating speed. Deceleration was begun 13 minutes later. The protein boundary in the cell containing starch was observed to move approximately three times as fast as that in the cell containing no starch.

*Example II*

In one experiment, 5 percent stained bovine serum albumin (BSA) in a 0.1 ionic strength phosphate-sodium chloride buffer (pH 7.5) was centrifuged in starch, and in free solution under otherwise identical conditions. Centrifugation was done in a Spinco Model L machine, using a SW 391 swinging-bucket rotor at approximately 20°. After centrifugal acceleration briefly to 20,000 r.p.m. the machine was stopped and the excess clear fluid was removed and more starch slurry added. This procedure was repeated once. These preparations were centrifuged 5 hours at 37,000 r.p.m., and decelerated without braking, and the tubes removed.

The distance the protein sedimented in free solution was estimated by a visual optical refraction method (FIG. 2). It may be noted that the card in FIG. 2 has a series of parallel angular lines. When a lusteriod centrifuge sample tube, indicated at $a$, is placed against this card, the angular straight lines will be abruptly bent or distorted to provide a sharp substantially horizontal peak at the inter surfaces of two liquids which have different indices of refraction, as indicated by the upper arrow which intersects sample tube $a$ in FIG. 2. This gives an indication of the point of separation of the two liquids where no dye has been provided for this purpose, as in the case of sample tube $a$ of FIG. 2. A comparison of tube $a$, filled with 5 percent BSA, and tube $b$, filled with 5 percent BSA stained with bromphenol blue in starch, both centrifuged for five hours at 38,000 r.p.m., reveals that the protein moves through starch at about twice the rate observed in free solution. Tubes $c$ and $d$ contain stained BSA in starch, and starch in buffer, respectively, for comparison with tube $b$. The former is centrifuged briefly for packing the starch, and the latter is uncentrifuged. No color was observed in the upper fourth of tube $b$. Staining the BSA does not alter its sedimentation noticeably, as is shown by the stained and clear samples in tubes $e$ and $f$, which have been centrifuged for 6 hours at 37,000 r.p.m. Tube $g$ contains water and indicates the pattern of bands seen when no refractive index gradient is present.

Figure 7:
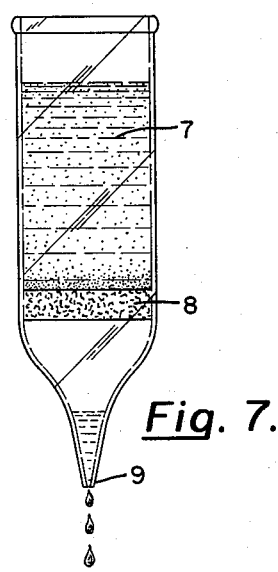
FIG. 7 is a schematic of a vessel for separating sedimented material from my improved sedimenting agent.

It should be appreciated that in carrying out this process the supernatent liquid and the sedimented material may be removed from the sample tube after the centrifuging step, and the resulting cake containing the sedimented materials in the lower portion thereof are separated by placing the cake in a vessel 7 on a fritted or sintered glass filter disk 8 as shown in FIG. 7. Water is added to form a concentrated slurry, and to displace the sedimented material from between the powder grains, so that it drips out through the funnel end 9 of the vessel and is collected.

Figure 3:
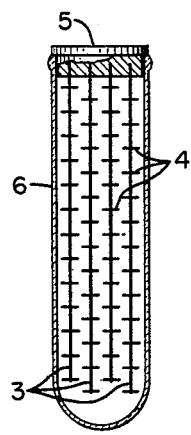
FIG. 3 is an elevation of a sample tube having a plurality of vertical rods with spaced projecting elements having surfaces to induce greater sedimentation.
Figure 4:
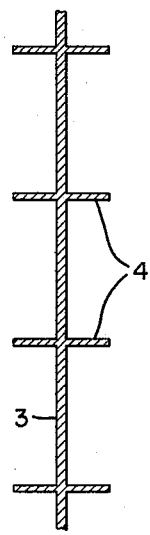
FIG. 4 is a fragmental detail of a portion of one of said rods showing one form the projecting elements may take.
Figure 5:
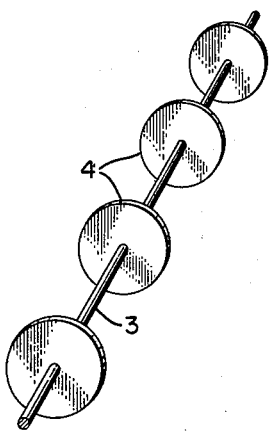
FIG. 5 is a perspective of a rod having spaced disk like projections that present substantially flat surfaces that facilitate and direct flow.

While a powder has been employed in the foregoing treatment, it is apparent that other sedimenting agents may also be used. In FIGS. 3, 4, and 5, a series of spaced flat surfaces are presented by utilizing spaced vertically extending rods 3 upon which are formed a plurality of spaced projections which preferably take the form of disks 4. These rods 3 are suspended in spaced relation from a plate or hanger 5 carried or supported by the upper extremity of the sample tube 6. In practice, the vertical rods 3 are preferably numerous and closely spaced, and may be suspended so that the projections or disks, from rod to rod may be staggered and not coincide, and in this way the streams flowing from these projections on one rod may be conveniently directed downwardly to those on the next adjacent rod. The plates may be relatively small, with radii of the range of 1/8", though not limited to this size. The rod and plates may be of metal, plastic or any other suitable material.

Figure 6:
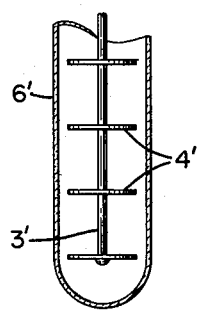
FIG. 6 is an elevation of a fragmental portion of a sample tube employing a single vertical rod having spaced plates for presenting surfaces over which flow may take place.

In another modification, the sedimenting agent takes the form of a series of larger diameter plates or disks 4' mounted on a single center staff or rod, preferably extending axially of the sample tube 6', as shown in FIG. 6. These plates which cover a substantial part of the diameter of the tube serve to direct the streams of molecules in their movement in the direction of increasing centrifugal force. Thus, it is important to maintain flow over the surfaces of the plates to realize the desired result of increasing the sedimentation.

While the above method has been described as a batch process, it might easily be adapted to a continuous process. With such an adaptation a solution is continuously introduced via a suitable tube to the bottom of any of the devices described, and the solution is caused to flow slowly to the top and is thence collected or removed. The rate of flow of fresh liquid may be adjusted so that downward sedimentation of particles in solution is faster than the upward flow of solvent.

Having thus described my invention, I claim:

1. A process for increasing the rate of sedimentation of particles of molecular size in a suspension comprising the steps of positioning insoluble powdered material in a centrifuge cell, introducing the suspension having the particles of molecular size to be separated into the cell, centrifuging the cell for a period sufficiently long to pack the powdered material, then adding additional powdered material and again centrifuging the cell to cause the particles to impinge upon the surfaces of the powdered material and induce preferential flow of fluid richer in said particles in the direction of the centrifugal force set up by the centrifuging.

2. A process for increasing the rate of sedimentation of particles of molecular size in a suspension comprising the steps of positioning finely divided inert material in a centrifuge cell, introducing a quantity of a suspension containing the particles of molecular size to be separated into the cell, centrifuging the cell for a sufficient interval to pack the inert material into a relatively stationary mass, and continuing the centrifuging at sufficient speed to set up a centrifugal field in a direction to bring the particles progressively into contact with the surfaces of the inert material and introduce preferential flow of fluid richer in the particles in the direction of increased centrifugal force to increase the rate of sedimentation.

3. A process for increasing the rate of sedimentation of proteins in a liquid comprising the step of positioning powdered starch in a centrifugal cell, introducing a liquid containing the proteins to be separated, centrifuging the cell to pack the starch, then adding additional starch and repeating the step to produce a mass of packed starch, then centrifuging at a speed that will produce a centrifugal field that will direct the particles of protein against the surfaces of the relatively fixed large starch particles and concentrate the denser protein molecules and complexes into streams and increase sedimentation.

References Cited in the file of this patent
UNITED STATES PATENTS

| | | |
|---|---|---|
| 868,483 | Reid | Oct. 15, 1907 |
| 1,605,596 | Langelier | Nov. 2, 1926 |
| 1,648,369 | Svedberg et al. | Nov. 8, 1927 |
| 1,893,451 | Smith | Jan. 3, 1933 |
| 1,938,894 | Darby et al. | Dec. 12, 1933 |
| 2,271,501 | Scott | Jan. 27, 1942 |
| 2,559,453 | Merrill et al. | July 3, 1951 |
| 2,596,082 | Stuart | May 6, 1952 |
| 2,628,021 | Staaff | Feb. 10, 1953 |
| 2,816,660 | Bounin | Dec. 17, 1957 |
| 2,822,126 | Cohn | Feb. 4, 1958 |
| 2,854,143 | Novak | Sept. 30, 1958 |

FOREIGN PATENTS

| | | |
|---|---|---|
| 68,800 | Germany | June 2, 1893 |

OTHER REFERENCES

Encyclopedia Britannica, vol. 5, copyright 1957, copy received in Scientific Library May 2, 1957, page 146, col. 2, lines 6 to 16, published by Encyclopedia Britannica, Inc.